W. PETERS & S. GINS.
NUT LOCK.
APPLICATION FILED AUG. 18, 1908.
910,309. Patented Jan. 19, 1909.
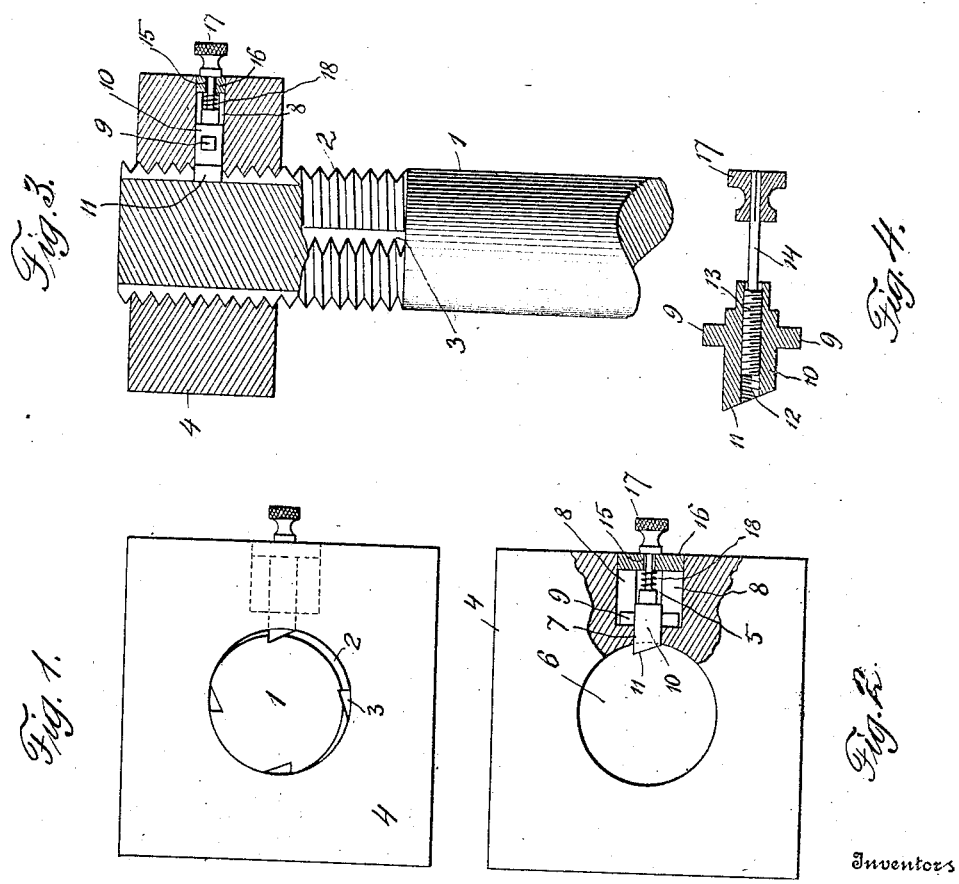
Witnesses
A. H. Rabsag,
R. H. Butler
Inventors
Wm. PETERS
and S. GINS
By H. C. Evert
Attorneys

UNITED STATES PATENT OFFICE.

WILLIAM PETERS AND SAMUEL GINS, OF MONESSEN, PENNSYLVANIA.

NUT-LOCK.

No. 910,309.  Specification of Letters Patent.  Patented Jan. 19, 1909.

Application filed August 18, 1908. Serial No. 449,121.

*To all whom it may concern:*

Be it known that we, WILLIAM PETERS, a citizen of the United States of America, and SAMUEL GINS, a subject of the King of Hungary, residing at Monessen, in the county of Westmoreland and State of Pennsylvania, have invented certain new and useful Improvements in Nut-Locks, of which the following is a specification, reference being had therein to the accompanying drawing.

This invention relates to nut locks, and the object of our invention is the provision of positive and reliable means in connection with a bolt and nut for preventing the nut from becoming accidentally disengaged from the bolt.

Our nut lock is particularly designed for rail joints and structures subjected to vibrations.

In constructing the nut lock, we have aimed to provide a locking mechanism that will not injure a bolt or nut in connection with which the same is used, and which will permit of a nut being tightened.

The detail construction entering into our invention will be presently described, and reference will now be had to the drawing, wherein—

Figure 1 is a front elevation of a nut and bolt constructed in accordance with our invention, Fig. 2 is a similar view of the nut partly broken away and partly in section, Fig. 3 is a plan of a portion of a bolt partly broken away and partly in section, Fig. 4 is a longitudinal sectional view of a locking member.

In the accompanying drawings, 1 designates a portion of a bolt having the threaded end 2 thereof provided with longitudinal V-shaped grooves 3, said grooves being preferably four in number and equally spaced apart upon the periphery of the bolt.

Adapted to screw upon the threaded end 2 of the bolt is a nut 4 having one side thereof provided with a recess 5, said recess communicating with the bore 6 of the nut by a rectangular opening 7. The top and bottom of the recess 5 is provided with oppositely disposed grooves 8 for the oppositely disposed lugs 9 of a locking member 10. This locking member 10 is provided with a beveled end 11 adapted to engage in the grooves 3 of the bolt, and with a longitudinal threaded bore 12 for a screw 13. This screw is provided with a shank 14 adapted to extend through an opening 15 formed centrally of a plate 16 mounted in the recess 5. The end of the shank 14 is provided with a knurled cap 17 and interposed between the end of the member 10 and the plate 16 is a coil spring 18.

The locking member 10 is normally held in engagement with the threaded end 2 of the bolt by a coil spring 18, and when it is desired to adjust the nut upon the bolt, the cap 17 is gripped and pulled outwardly to move the beveled end of the locking member out of one of the grooves 3. The oppositely disposed lugs 9 are employed to limit the inward movement of the locking member 10 when the nut 4 is detached from the bolt.

Having now described our invention what we claim as new, is:—

The combination with a bolt having the threaded end thereof provided with a longitudinal groove, of a nut adapted to screw upon said bolt and having one side thereof provided with a recess extending at right angles with respect to the bolt, the inner wall of said recess provided with an opening for establishing communication between said recess and the bore of said nut, said recess having its top and bottom walls provided with grooves, a locking member mounted in said recess, extending through said opening and adapted to engage in the groove of the bolt, oppositely disposed lugs formed integral with said member and extending in said grooves whereby the movement of said member is guided, said locking member having a longitudinally extending threaded bore, a screw adjustably mounted in said bore, a shank formed integral with said screw and projecting from one side of the nut, a plate mounted upon said shank and closing the outer end of said recess, said plate being flush with one side of the nut, a coil spring mounted upon said shank and interposed between said plate and the end of said member, and a cap carried by the projecting end of the shank and arranged exteriorly of said plate.

In testimony whereof we affix our signatures in the presence of two witnesses.

WILLIAM PETERS.
SAM. GINS.

Witnesses:
W. A. BARBELMANN,
G. G. WESTON.